United States Patent
Poojary et al.

(10) Patent No.: US 9,960,957 B2
(45) Date of Patent: May 1, 2018

(54) METHODS FOR PRIORITIZING FAILOVER OF LOGICAL INTERFACES (LIFS) DURING A NODE OUTAGE AND DEVICES THEREOF

(71) Applicant: NetApp, Inc., Sunnyvale, CA (US)

(72) Inventors: Pradeep Poojary, Bangalore (IN); Sanjeev Manurkar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 221 days.

(21) Appl. No.: 14/812,550

(22) Filed: Jul. 29, 2015

(65) Prior Publication Data

US 2017/0033975 A1 Feb. 2, 2017

(51) Int. Cl.
*H04L 12/24* (2006.01)

(52) U.S. Cl.
CPC ...... *H04L 41/0668* (2013.01); *H04L 41/0609* (2013.01)

(58) Field of Classification Search
CPC ..... H04L 12/66; H04L 43/08; H04L 41/0893; H04L 41/50; G06F 15/16
USPC .................................. 709/223, 224; 370/235
See application file for complete search history.

(56) References Cited

U.S. PATENT DOCUMENTS

| | | | | |
|---|---|---|---|---|
| 7,369,495 B1 * | 5/2008 | Lemaire | ............. | H04L 12/5601 370/230.1 |
| 7,606,895 B1 * | 10/2009 | Dini | ....................... | H04L 12/14 709/223 |
| 9,204,329 B2 * | 12/2015 | Boyle | .................. | H04W 48/00 |
| 2005/0188240 A1 * | 8/2005 | Murphy | .............. | G06F 11/0709 714/4.4 |
| 2009/0172148 A1 * | 7/2009 | Underwood | ............ | H04L 12/66 709/224 |
| 2012/0295611 A1 * | 11/2012 | Amirijoo | ............ | H04W 52/146 455/424 |
| 2013/0003736 A1 * | 1/2013 | Szyszko | .............. | H04L 47/2441 370/392 |
| 2014/0085105 A1 * | 3/2014 | Vaswani | .................. | G01D 4/02 340/870.11 |
| 2014/0089314 A1 * | 3/2014 | Iizuka | ...................... | G06F 3/167 707/740 |
| 2014/0122424 A1 * | 5/2014 | Barnes | .............. | G06F 17/30091 707/610 |
| 2014/0123293 A1 * | 5/2014 | Tripp | ..................... | G06F 21/577 726/25 |
| 2016/0094450 A1 * | 3/2016 | Ghanwani | ........... | H04L 43/0894 370/235 |

* cited by examiner

*Primary Examiner* — Tesfay Yohannes
(74) *Attorney, Agent, or Firm* — LeClairRyan PLLC

(57) ABSTRACT

Methods, devices, and non-transitory computer readable media that prioritize failover of logical interfaces (LIFs) include identifying an outage on another one of the plurality of node computing devices in a storage cluster. When the another one of the plurality of node computing devices with the identified outage has provisioned a number of logical interfaces (LIFs) above a stored provisioning threshold is determined. Failover of the LIFs on the another one of the plurality of node computing devices with the outage is managed in an order based on at least one of a plurality of priority weight values assigned to each of the LIFs.

15 Claims, 4 Drawing Sheets

| Node | Logical Interface Name | Number of Active Connections |
|---|---|---|
| node controller computing device 12(1) or node 0 | datalif1a | 3 |
| node controller computing device 12(1) or node 0 | datalif2a | 6 |
| node controller computing device 12(1) or node 0 | datalif3a | 5 |
| node controller computing device 12(2) or node 1 | datalif1b | 3 |
| node controller computing device 12(1) or node 1 | datalif2b | 3 |
| node controller computing device 12(1) or node 1 | datalif3b | 5 |

FIG. 4

METHODS FOR PRIORITIZING FAILOVER OF LOGICAL INTERFACES (LIFS) DURING A NODE OUTAGE AND DEVICES THEREOF

FIELD

This technology generally relates to methods and devices for managing nodes and, more particularly to methods for prioritizing failover of logical interfaces (LIFs) during a node outage and devices thereof

BACKGROUND

In a storage management environment, it is possible to over-provision a number of logical interfaces LIFs on one or more of the nodes. In such a situation, when a node outage occurs, such as an unexpected node outage or even during a scheduled node outage for an upgrade events, the failover from the over provisioned node to another node may result in one or more LIFs not being hosted anywhere. If an active LIF is not hosted during a node outage, this can result in a disruption such that client computing devices are unable to access data or other resources from the back end storage device.

SUMMARY

A method for prioritizing failover of logical interfaces (LIFs) includes identifying by one of a plurality of node computing devices an outage on another one of the plurality of node computing devices in a storage cluster. When the another one of the plurality of node computing devices with the identified outage has provisioned a number of logical interfaces (LIFs) above a stored provisioning threshold is determined by the one of a plurality of node computing devices. Failover of the LIFs on the another one of the plurality of node computing devices with the outage is managing by the one of a plurality of node computing devices in an order based on at least one of a plurality of priority weight values assigned to each of the LIFs.

A node controller computing device includes a memory coupled to one or more processors which are configured to be capable of executing programmed instructions stored in the memory to identify an outage on another one of the plurality of node computing devices in a storage cluster. When the another one of the plurality of node computing devices with the identified outage has provisioned a number of logical interfaces (LIFs) above a stored provisioning threshold is determined. Failover of the LIFs on the another one of the plurality of node computing devices with the outage is managed in an order based on at least one of a plurality of priority weight values assigned to each of the LIFs.

A non-transitory computer readable media for prioritizing failover of logical interfaces (LIFs) includes identifying an outage on another one of the plurality of node computing devices in a storage cluster. When the another one of the plurality of node computing devices with the identified outage has provisioned a number of logical interfaces (LIFs) above a stored provisioning threshold is determined. Failover of the LIFs on the another one of the plurality of node computing devices with the outage is managed in an order based on at least one of a plurality of priority weight values assigned to each of the LIFs.

This technology provides a number of advantages including providing methods, devices, and non-transitory computer readable media that effectively prioritize failover of logical interfaces (LIFs) during a node outage. With this technology, LIFs with active connections are given a higher priority to failover rather than other LIFs without any connections or with a lower number of active connections. As a result, with this technology during node outages, including unexpected node outages or even during scheduled node outages for upgrade events, LIFs with active connections may either be disruption free or at least any impact on disrupting active connections during the node outage is minimized.

BRIEF DESCRIPTION OF THE DRAWINGS

FIG. 4 is an example of a table of a number of obtained and stored logical interfaces (LIFs) and a number of active connections for the node controller computing devices in the storage cluster shown in FIG. 1.

DETAILED DESCRIPTION

Figure 1:
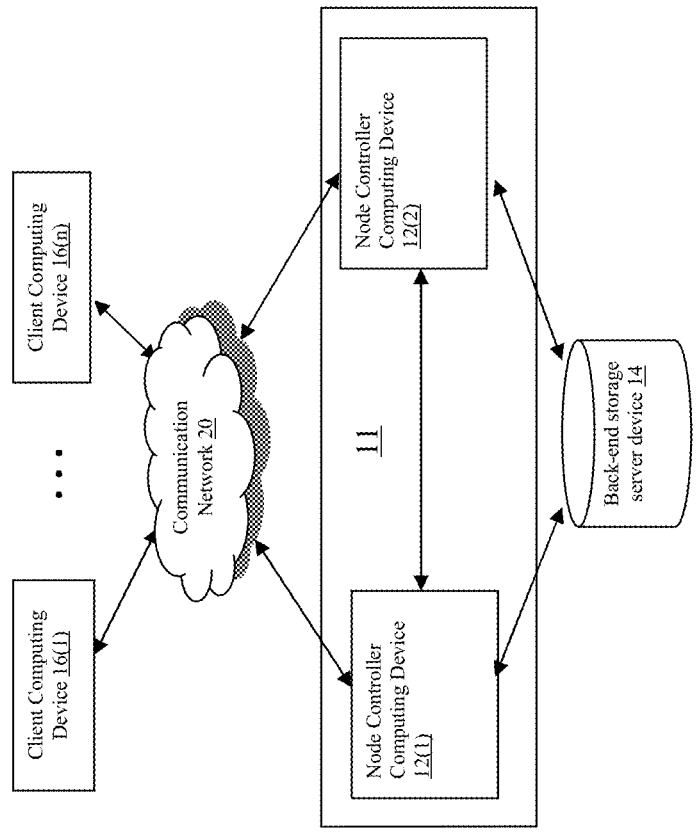
FIG. 1 is a block diagram of a network environment with an example of a node controller computing devices in a storage cluster.
Figure 2:
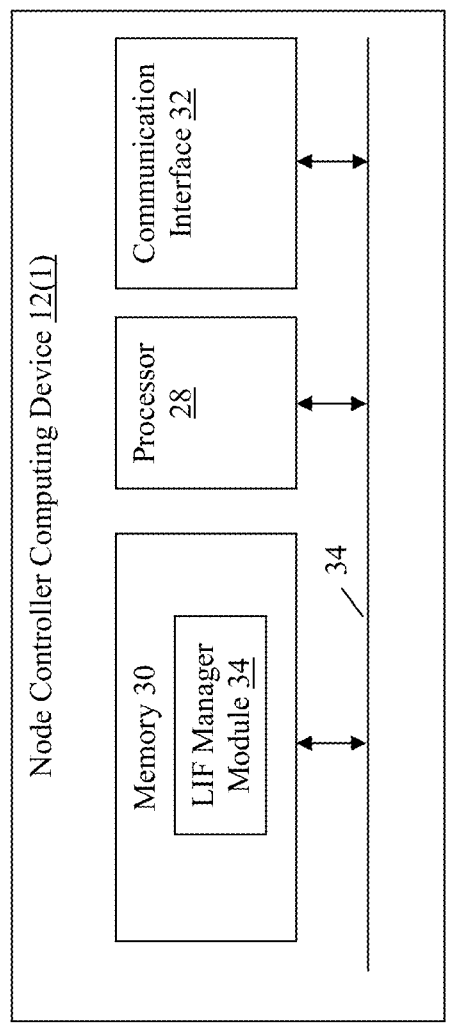
FIG. 2 is a block diagram of an example of one of the node controller computing devices.
Figure 3:
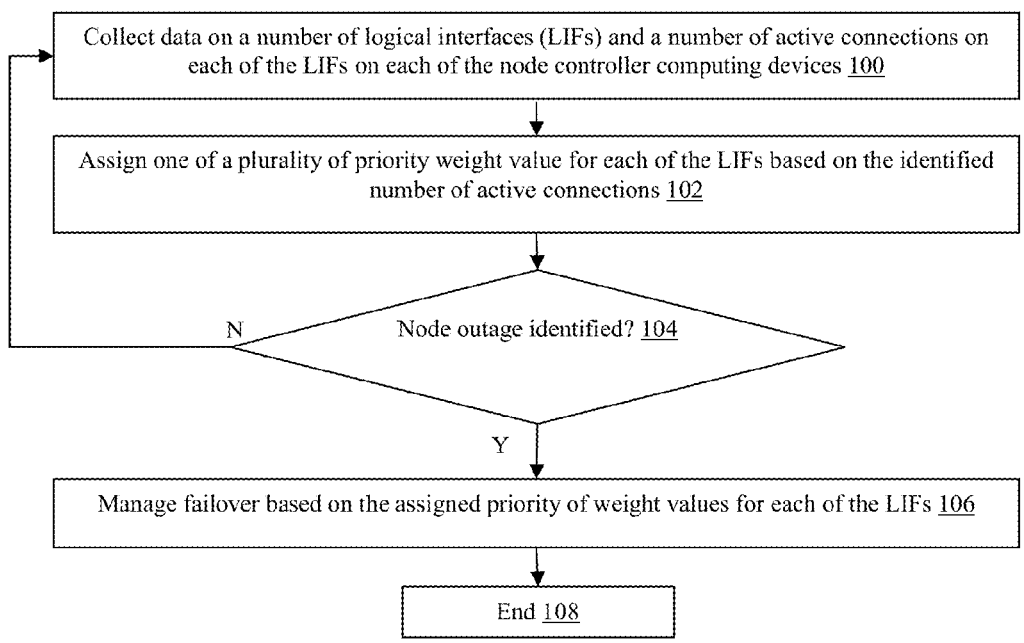
FIG. 3 is a flow chart of an example of a method for prioritizing failover of logical interfaces (LIFs) during a node outage.

An example of an environment 10 with a storage cluster 11 comprising node controller computing devices 12(1)-12(2) is illustrated in FIGS. 1-2. In this particular example, the environment 10 includes the node controller computing devices or nodes 12(1)-12(2), a back-end storage server device 14, and client computing devices 16(1)-16(n) coupled via one or more communication networks 20, although the environment could include other types and numbers of systems, devices, components, and/or other elements in other configurations. By way of example only, the environment may include additional numbers of node controller computing devices and/or additional numbers of back-end storage server devices in other configurations. This technology provides a number of advantages including providing methods, non-transitory computer readable media and devices that effectively prioritize failover of logical interfaces (LIFs) during a node outage.

Referring more specifically to FIGS. 1-2, each of the node controller computing devices 12(1)-12(2) in the storage cluster 11 are used to manage service of input or output (I/O) operations between the back-end storage server device 14 and the client computing devices 16(1)-16(n) by way of example only, although each could perform other types and/or numbers of other operations and other types an/or numbers of nodes could be used. Additionally, in this particular example each of the node controller computing devices 12(1)-12(2) represent a physical machine used to manage these I/O operations, although other configurations, such as a virtual network with virtual machines implementing one or more of the node controller computing devices 12(1)-12(2) could also be used by way of example only.

For ease of illustration and description, only node controller computing device 12(1) is illustrated in FIG. 2. In this particular example, node controller computing device 12(2) is the same in structure and operation as the node controller computing device, although any of the node controller computing devices could comprise other types and/or numbers of other physical and/or virtual systems, and/or other devices, components, and/or other elements in other configurations with other operations and/or functions. Additionally, in this particular example the node controller computing device 12(1) includes a processor 28, a memory 30, and a communication interface 32 which are coupled together by a bus 30, although the node controller computing device 12(1) may include other types and/or numbers of physical and/or virtual systems, devices, components, and/or other elements in other configurations.

The processor 28 of in the node controller computing device 12(1) may execute one or more programmed instructions stored in the memory 30 aspects of this technology as illustrated and described in the examples herein, although other types and numbers of functions and/or other operation can be performed. The processor 28 in the node controller computing device 12(1) may include one or more central processing units and/or general purpose processors with one or more processing cores, for example.

The memory 30 of in the node controller computing device 12(1) stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 28, can be used for the memory 30. In this particular example, the memory 30 in the node controller computing device 12(1) further includes a LIF manager module 34 with programmed instructions for managing one or more LIF operations, such as those illustrated and described herein, although the memory could comprise other types and/or numbers of modules, programmed instructions and/or other data.

The communication interface 32 in the node controller computing device 12(1) operatively couples and communicates with the other node controller computing device 12(2), the back-end storage server device 14 and one or more of the client computing devices 16(1)-16(n) which are all coupled together by one or more of the communication networks 20, although other types and numbers of communication networks or systems with other types and numbers of connections and configurations to other devices and elements. By way of example only, the communication networks 20 can use TCP/IP over Ethernet and industry-standard protocols, including NFS, CIFS, SOAP, XML, LDAP, SCSI, and SNMP, although other types and numbers of communication networks, can be used. The communication networks 20 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the client computing devices 16(1)-16(n) may run applications that may provide an interface to make requests for and receive content and/or other network resources hosted by one or more of the back-end storage server devices 16(1)-16(n) via one or more of the node controller computing devices 12(1)-12(2) in storage cluster 11.

The back-end storage server device 14 may store and provide data or other network resources in response to requests from the client computing devices 16(1)-16(n) via the one or more of the communication networks 20, for example, although other types and numbers of storage media in other configurations could be used. In particular, the back-end storage server devices 14 may comprise various combinations and types of storage hardware and/or software and represent a system with multiple network server devices in a data storage pool, which may include internal or external networks. Additionally, various network processing applications, such as CIFS applications, NFS applications, HTTP Web Network server device applications, and/or FTP applications, may be operating on the back-end storage server device 14 and transmitting data (e.g., files or web pages) in response to requests from the client computing devices 16(1)-16(n).

The back-end storage server device 14 and each of the client computing devices 16(1)-16(n) may include a processor, a memory, and a communication interface, which are coupled together by a bus or other link, although other numbers and types of devices and/or nodes as well as other network elements could be used.

Although the exemplary environment 10 with the node management computing device 12, a storage cluster with the node controller computing devices 12(1)-12(2), back-end storage server device 14, client computing devices 16(1)-16(n) and the communication networks 20 are described and illustrated herein, other types and numbers of systems, devices, components, and/or elements in other configurations or topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for prioritizing failover of logical interfaces (LIFs) during a node outage will now be illustrated and described with reference to FIGS. 1-4. In step 100, each of the node controller computing devices 12(1)-12(2) may collect, store, and/or share data on a number of logical interfaces (LIFs) and a number of active connections on LIFs on each of the node controller computing devices 12(1)-12(2), although other types and/or amounts of data for prioritizing failover may be collected, stored, and/or shared. In this particular example, the number of logical interfaces (LIFs) and a number of active connections on LIFs on each of the node controller computing devices 12(1)-12(2) is obtained periodically, such as every 60-120 seconds, although other time periods and/or other manners for obtaining these numbers, such as needed or requested, can be used. Additionally by way of example only, the number of active connection can be determined by each of the node controller computing devices 12(1)-12(2) by obtaining a network statistics (netstat) output which includes data on the active number of connections on each of the LIFs. Further by way of example only, in FIG. 4 an example of a stored table with a number of LIFs and a number of active connections for node controller computing device 12(1) or "node 0" and for node controller computing device 12(2) or "node 1" is illustrated. In this particular illustrative example, node controller computing device 12(1) or "node 0" has three LIFs: datalif1a with three (3) active connections); datalif2a with six (6) active connections); and datalif3a with five (5) active connections) and node controller computing device 12(2) or "node 1" has three LIFs: datalif1b with three (3) active connections); datalif2b with three (3) active connections); and datalif3b with five (5) active connections).

In step 102, each of the node controller computing devices 12(1)-12(2) may assign one of a plurality of priority weight values for each of the identified LIFs based on the identified number of active connections, although other approaches for assigning one of a plurality of weight values may be used. Additionally, each of the node controller computing devices 12(1)-12(2) may assign, store, and/or share the assigned priority weight values, although again other types and/or amounts of data to manage failover may be obtained, stored, and/or shared. By way of example only, in node controller computing device 12(1) or "node 0" the LIF "datalif2a" with six (6) active connections would have a higher assigned priority weight value than LIF "datalif3a" with five (5) active connections which would have a higher assigned priority weight value than LIF "datalif1a" with three (3) active connections. Additionally by way of example only, in node controller computing device 12(2) or "node 1" the LIF "datalif3b" with five (5) active connections) would have a higher assigned priority weight value than LIF "datalif1b" and LIF "datalif2b" which each have three (3) active connections. As illustrated in this second example, one or more other factors relating to the LIFs may need to be utilized by node controller computing device 12(2) or "node 1" to prioritize failover between LIF "datalif1b" and LIF "datalif2b", such as prioritizing alphabetically or a randomized selection of which to failover in case of a tie by way of example only.

In step 104, each of the node controller computing devices 12(1)-12(2) may monitor for a node outage in one of the node controller computing devices 12(1)-12(2). By way of example only, the node outage may be an unexpected outage or a scheduled outage. If in step 104, one of the node controller computing devices 12(1)-12(2) does not identify a node outage in another one of the node controller computing devices 12(1)-12(2), then the No branch is taken back to step 100 collect and store data on a number of logical interfaces (LIFs) and a number of active connections on LIFs on each of the node controller computing devices 12(1)-12(2) as described earlier.

If in step 104, one of the node controller computing devices 12(1)-12(2) does identify a node outage in another one of the node controller computing devices 12(1)-12(2), then the Yes branch is taken to step 106. In step 106, the one of the node controller computing devices 12(1)-12(2) that detected the outage may manage failover of the LIFs from the another one of the node controller computing devices 12(1)-12(2) based on the assigned one of a plurality of priority weight values for each of the identified LIFs. By way of example only, if node controller computing device 12(1) or "node 0" had the identified node outage, then the node controller computing device 12(2) or "node 1" would failover the LIF "datalif2a" with six (6) active connections), then the LIF "datalif3a" with five (5) active connections which would have a higher assigned priority weight value than LIF "datalif1a" with three (3) active connections based on the assigned one of a plurality of priority weight values as described earlier. Additionally by way of another example only, if the node controller computing device 12(2) or "node 1" had the identified node outage, then the node controller computing device 12(1) or "node 0" would failover the LIF "datalif3b" with five (5) active connections) followed by either LIF "datalif1b" or the LIF "datalif2b" depending in the assigned priority weight value based on the other one or more factors as described earlier.

In these examples a substantially reduced number of LIFs is illustrated for ease of discussion. If one of the node controller computing devices 12(1) or 12(2) with the node outage was over provisioned for the number of LIFs above a stored threshold, then any of the LIFs with a lower assigned priority weight value, such as a lower priority weight value assigned based on a lower number of active connections or no current active connections, may not be failed over to the other one of the node controller computing devices 12(1) or 12(2). By way of example only, if node controller computing devices 12(1) and 12(2) could each maintain 256 LIFs and had a maximum of stored provisioning threshold of 128 LIFs, but were configured to have 130 LIFs in violation of the maximum of stored provisioning threshold, then during a failover two of the LIFs with the fewest or no active connections resulting a the lowest two assigned priority weight values would not be failed over.

Accordingly, as illustrated and described by way of the examples herein, this technology provides methods, devices, and non-transitory computer readable media that effectively prioritize failover of logical interfaces (LIFs) during a node outage. With this technology, LIFs with active connections are given a higher priority to failover rather than other LIFs without any connections or with a lower number of active connections. As a result, with this technology during node outages, including unexpected node outages or even during scheduled node outages for upgrade events, LIFs with active connections may either be disruption free or at least any impact on disrupting active connections during the node outage is minimized.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   identifying, by a computing device, an outage on another computing device in a same storage cluster as the computing device;

determining, by the computing device, when the another computing device has provisioned a number of logical interfaces (LIFs) above a stored provisioning threshold, wherein one or more of the LIFs are associated with active connections that facilitate client access to data hosted by the storage cluster; and managing, by the computing device, failover of the LIFs on the another computing device in an order based on at least one of a plurality of priority weight values assigned to each of the LIFs, when the determining indicates that the another computing device has provisioned a number of LIFs above a stored provisioning threshold.

2. The method as set forth in claim 1 further comprising periodically obtaining and storing, by the computing device, the number of LIFs on at least the another computing device.

3. The method as set forth in claim 1 further comprising determining, by the computing device, the assigned one of the plurality of priority weight values for each of the LIFS on at least the another computing device.

4. The method as set forth in claim 3 wherein the determining the assigned one of the plurality of priority weight values for each of the LIFS on at least the computing device further comprises:

identifying a number of the active connections for each of the LIFs on the another computing device; and assigning one of the plurality of priority weight value for each of the LIFs on the another computing device based on the identified number of the active connections.

5. The method as set forth in claim 1 wherein the identified outage is one of an unexpected outage or a scheduled outage.

6. A computing device, comprising:

a memory containing a machine readable medium comprising machine executable code having stored thereon instructions for performing a method of providing data sessions with clients that access data containers of a shared storage; and a processor coupled to the memory, the processor configured to execute the machine executable code to cause the processor to:

identify an outage on another computing device in a same storage cluster as the computing device;

determine when the another computing device has provisioned a number of logical interfaces (LIFs) above a stored provisioning threshold, wherein one or more of the LIFs are associated with active connections that facilitate client access to data hosted by the storage cluster; and manage failover of the LIFs on the another computing device in an order based on at least one of a plurality of priority weight values assigned to each of the LIFs, when the determining indicates that the another computing device has provisioned a number of LIFs above a stored provisioning threshold.

7. The device as set forth in claim 6 wherein the processor is further configured to execute the machine executable code to cause the processor to periodically obtain and store the number of LIFs on at least the another computing device.

8. The device as set forth in claim 6 wherein the processor is further configured to execute the machine executable code to cause the processor to determine the assigned one of the plurality of priority weight values for each of the LIFS on at least the another computing device.

9. The device as set forth in claim 8 wherein the processor is further configured to execute the machine executable code to cause the processor to:

identify a number of the active connections for each of the LIFs on the another computing device; and assign one of the plurality of priority weight value for each of the LIFs on the another computing device based on the identified number of the active connections.

10. The device as set forth in claim 6 wherein the identified outage is one of an unexpected outage or a scheduled outage.

11. A non-transitory machine readable medium having stored thereon instructions for prioritizing failover of logical interfaces (LIFs) comprising machine executable code which when executed by at least one machine, causes the machine to:

identify an outage on another a computing device in a same storage cluster;

determine when the computing device has provisioned a number of logical interfaces (LIFs) above a stored provisioning threshold, wherein one or more of the LIFs are associated with active connections that facilitate client access to data hosted by the storage cluster; and manage failover of the LIFs on the another computing device in an order based on at least one of a plurality of priority weight values assigned to each of the LIFs, when the determining indicates that the another computing device has provisioned a number of LIFs above a stored provisioning threshold.

12. The medium as set forth in claim 11 wherein the machine executable code when executed by the machine, further causes the machine to periodically obtain and store the number of LIFs on at least the another computing device.

13. The medium as set forth in claim 11 wherein the machine executable code when executed by the machine, further causes the machine to determine the assigned one of the plurality of priority weight values for each of the LIFS on at least the another computing device.

14. The medium as set forth in claim 13 wherein the machine executable code when executed by the machine, further causes the machine to another:

identify a number of the active connections for each of the LIFs on the another computing device; and assign one of the plurality of priority weight value for each of the LIFs on the another computing device based on the identified number of the active connections.

15. The medium as set forth in claim 11 wherein the identified outage is one of an unexpected outage or a scheduled outage.

* * * * *